United States Patent
Huck et al.

(10) Patent No.: US 8,515,960 B2
(45) Date of Patent: Aug. 20, 2013

(54) AGGREGATING CONTENT FROM MULTIPLE CONTENT CONTRIBUTORS

(75) Inventors: Jason Alan Huck, Fargo, ND (US); Matthew Robert Carlson, Moorhead, MN (US); Brian J. Moore, West Fargo, ND (US); Lee Charles Spiesman, Fargo, ND (US); Arijit Chatterjee, Fargo, ND (US); Steven Jon Omberg, Dent, MN (US)

(73) Assignee: Microsoft Corporation, Redmond, WA (US)

( * ) Notice: Subject to any disclaimer, the term of this patent is extended or adjusted under 35 U.S.C. 154(b) by 473 days.

(21) Appl. No.: 12/608,733

(22) Filed: Oct. 29, 2009

(65) Prior Publication Data

US 2011/0106810 A1 May 5, 2011

(51) Int. Cl.
*G06F 17/00* (2006.01)

(52) U.S. Cl.
USPC ............ 707/741; 707/812; 707/769; 715/205

(58) Field of Classification Search
USPC ................... 707/741, 812, 769; 715/205
See application file for complete search history.

(56) References Cited

U.S. PATENT DOCUMENTS

| | | | |
|---|---|---|---|
| 8,032,511 B1 * | 10/2011 | Skrenta et al. | ................ 707/709 |
| 2002/0049792 A1 | 4/2002 | Wilcox | |
| 2002/0161603 A1 | 10/2002 | Gonzales | |
| 2003/0121008 A1 | 6/2003 | Tischer | |
| 2007/0192674 A1 | 8/2007 | Bodin | |
| 2008/0301670 A1 | 12/2008 | Gouge | |
| 2009/0012992 A1 | 1/2009 | Gill | |
| 2009/0157667 A1 | 6/2009 | Brougher | |

OTHER PUBLICATIONS

Patrick R. Leary et al., "uBioRSS: Tracking Taxonomic Literature Using RSS," Bioinformatics Applications Note, vol. 23 No. 11 2207, pp. 1434-1436., Mar. 28, 2007.
netLogex, "Services—Electronic Publishing Content Management," printed Jun. 24, 2009, 2 pages. http://www.netlogex.com/pp./content.htm.

* cited by examiner

*Primary Examiner* — Belix M Ortiz Ditren
(74) *Attorney, Agent, or Firm* — Merchant & Gould

(57) ABSTRACT

Utilizing logical identifiers or sets of metadata to describe, organize, and index content associated with a software application system from one or more content contributors is provided. When a request is made for specific content, the request may point to a logical identifier, and pieces of content applicable to the requested content may be retrieved and presented to a user. By utilizing schematized metadata associated with individual content items, a user's experience may be improved by providing content available from a plurality of content contributors applicable to the user's query.

18 Claims, 3 Drawing Sheets

AGGREGATING CONTENT FROM MULTIPLE CONTENT CONTRIBUTORS

BACKGROUND

Deployed software systems (software applications, modules, groupings of applications or modules, etc.) are typically accompanied by documentation that provides information about the associated software systems to a requesting user. For example, documentation accompanying a given software application may include help content, application operating specifications and data, software development instructions and/or functionality, and the like. Such application documentation is typically supplied with the software system by the original developer of the system. When a software system is customized by one or more third parties, or when documentation content is available for various contexts (for example, multiple user language contexts), problems providing requested documentation content may occur. For example, if a third party software contributor (e.g., software developer/publisher) customizes an application to add customized functions, help content accompanying the customization may overwrite original help content accompanying the pre-customization version of the application. Thus, while a subsequent requesting user may have access to help content associated with the customization, he/she may not have access to help content for other non-customized features of the application.

Completely documenting a multi-layered software system that is produced by multiple independent parties requires a similar approach for describing and documenting the capabilities of the system. Currently, such software system documentation is not designed in a multi-layered architecture. For example, when a user makes a request for help content with context (e.g., help content in German), contextual information from the software system documentation is static and singular. That is, in most help or information systems, the link from context information to system documentation is static and singular whereby the context information is predetermined and is not based on information parsed from all available documentation content associated with the system. In such systems, a user requesting help content may be provided a single topic containing partial help content, and may not be given a choice from multiple pieces of content. Thus, a problem may occur with current online software system documentation in a multi-layered system because it may be difficult to determine which piece of documentation to reference in response to a given documentation request, for example, base documentation provided with the original software system versus documentation accompanying customizations or other modifications provided by a third party contributor.

It is with respect to these and other considerations that the present invention has been made.

SUMMARY

Embodiments of the present invention are directed to aggregating, indexing and presenting software system documentation (i.e., content) from multiple contributors. A minimal set of metadata may be used to describe each documentation content item, and documentation content may be indexed and organized using this metadata. Each item of documentation content associated with a system may be stored on a server and described by the minimal set of metadata. When a user makes a documentation content request, as opposed to referencing a physical or specific piece of documentation, pieces of content may be aggregated by a help service and presented to the user. According to one embodiment, content may be aggregated by a help service, wherein the help service may be exposed to a requesting user as a Web service or via a Web service. The aggregated content items may contain content from multiple contributors. Requests for content may be collected and a distinct response may be given that contains all content items from all content contributors. The requested content may be retrieved and displayed according to a number of suitable methods. For example, according to embodiments, by utilizing hypertext markup language (HTML) based format for content and extensible markup language (XML) based format for metadata, and by hosting the HTML based content and XML based metadata on a server, documentation may be easier to manipulate and more quickly retrieved and presented to a requesting user.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION

Figure 1:
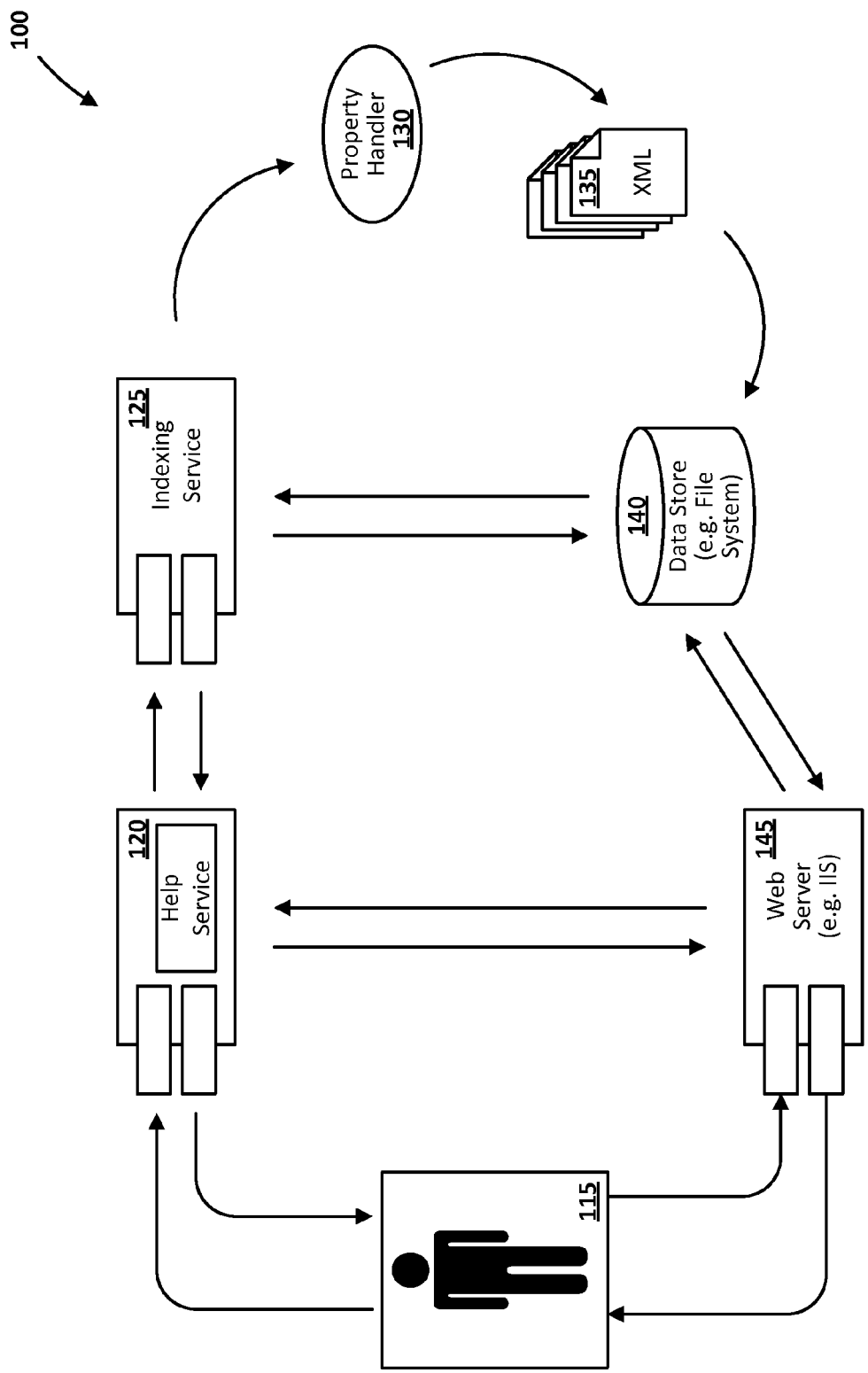
FIG. 1 is a simplified block diagram of a computing architecture in which embodiments of the present invention may be implemented.

As briefly described above, embodiments of the present invention are directed to aggregating, indexing and presenting software system documentation (i.e., content) from multiple contributors. The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

When using a software system that is customizable and that may have multiple contributors, the system may have an architecture that is multi-layered. A contributor to a software system may include an original implementation company, as well as independent software vendors (ISVs), partners, and/or customers who customize it. Each of such contributors to a given software system may include software developers, authors, publishers, or any others associated with development, deployment or customization of a given software system. In addition, end-users of a software system may customize documentation content. For example, instructions for use for a particular function may be customized by an end-user, although customization of the software system itself may not be done by the end-user.

According to embodiments, a minimal set of metadata may be used to describe each documentation item (for example, metadata associated with help content items, application operating specification content, software development instructions and/or functionality, etc.), and such documentation content may be indexed and organized using this metadata. Each item of documentation content associated with a system may be stored on a server and described by the minimal set of metadata. When a user makes a documentation content request, as opposed to referencing a physical or specific piece of documentation, pieces of content may be aggregated by a help service and presented to the user. The aggregated content may contain multiple pieces of content from one or more contributors. Requests for content may be collected and a distinct response may be given that contains all documentation content items from all content contributors. A context of a user's request, for example, a particular function that the user is employing when a request for help is made, may be utilized to provide context sensitive content items to the user, for example, help content associated with printing. The requested content may be retrieved and displayed according to a number of suitable methods. For example, according to embodiments, by utilizing hypertext markup language (HTML) based format for content and extensible markup language (XML) based format for metadata, and by hosting the HTML based content and XML based metadata on a server, documentation may be easier to manipulate and more quickly retrieved and presented to a requesting user.

Embodiments of the present invention allow for linking documentation content requests to a logical matter, as opposed to a physical document. The logical matter may be made up of multiple pieces of content from a plurality of contributors, which may be aggregated by a help service. According to one embodiment, when a user makes a request for content, rather than being linked to a single topic containing partial help content, he/she may be linked to a summary page of all the items of documentation content relevant to the request. That content may include base documentation for the software system, documentation for a customization provided by an independent software vendor/contributor (ISV), as well as, other added documentation by contributors and/or users. For example, in a case where a customer (e.g., a company) may have a specific process on how to fill out a form provided by a software application, the customer may add the process to the documentation associated with the application. If a user subsequently requests help for a form within a software application, he/she may be linked to a summary page of base documentation for the software application, any contributor customization documentation, as well as, the customer's (company's) customized procedures for processing the example form.

By utilizing logical identifiers or sets of metadata to describe content, content from a plurality of contributors may be organized and indexed. When a request is made for contextually specific content, the request may point to a logical identifier, and pieces of content applicable to the requested context may be retrieved and presented to a user. For example, if content is requested via a French language help request interface, content available in French may be returned in response to the request. For another example, if a user requests help content in association with the use of a particular application functionality, that context may be utilized to point to help content associated with the particular functionality. By providing schematized metadata, a user's experience may be improved by providing more specific content applicable to his/her use case.

FIG. 1 is a simplified block diagram of a system 100 for aggregating, indexing and presenting content to a requesting user. According to embodiments, the system 100 may reside in a single computing device, such as a desktop or laptop computer, or the system 100 may reside in a remote computing device or server that may be accessed via one or more other computing devices via a distributed computing environment such as the Internet or an intranet. Referring to FIG. 1, a Help Service 120 may comprise one or more application programming interfaces (API) for associating content requests with metadata associated with responsive content. For example, the Help Service 120 may expose methods for allowing for retrieval and aggregation of a Table of Contents, Keyword Index, and other content-related items associated with available content accompanying an example software application. The Help Service 120 may also expose methods for retrieval and modification of any user specific data, as well as, for retrieval of presentation-related configuration information.

According to embodiments, the Help Service 120 serves as an interface between a user 115 and an Indexing Service 125 (described below) for allowing a user to request documentation content about a software application, software application feature or software application-enabled document. After responsive content is retrieved via the Indexing Service or after one or more paths to stored responsive content is retrieved, the Help Service 120 is operative to format retrieved data for presentation to the user 115. For example, the Help Service 120 may be operative to format retrieved content according to HTML for presentation via an Internet-based Web page. According to one embodiment, the response may be a Web page containing a set of links that a user may select and to which the user may navigate for retrieving documentation content (e.g., help content) desired by the user.

According to one embodiment, the content provided by the Help Service 120 may be exposed to a requesting user via a Web service. A web service is one way in which content from the Help Service may be exposed to users, but is not limiting of other methods for providing content. According to one embodiment, the Help Service may be provided according to Windows Communication Foundation (WCF). The WCF-based Help Service may then be exposed to users as a Web Service.

Where documentation content is retrieved from a plurality of contributors (e.g., software developers), the Help Service 120 may be operative to provide an aggregated Table of Contents or Keyword Index aggregated from tables of contents or keyword indexes provided by each of the plurality of contributors so that a requesting user may receive a table of contents or keyword index applicable to an aggregation of content items retrieved from application system documentation provided by each of the contributors.

An Indexing Service 125 may be queried by the Help Service 120 for content responsive to the user's request. According to an embodiment, the Indexing Service 125 is a software application service operative to extract content items from documentation content files and to construct an indexed catalog of content items or artifacts to facilitate efficient and rapid searching and retrieval. Consider, for example, a calculation function in a spreadsheet application, and consider that an original developer of the example spreadsheet application created one or more "out-of-the-box" calculation functions available via the spreadsheet application. Consider also that the developer created a variety of documentation content, such as help content, developer tools, instructions, etc., that are available for retrieval by users of the spreadsheet application. Now consider that one or more third party software developers (contributors) created customizations to the spreadsheet application that add various customized calculation functions for use in particular cases (e.g., hospital cost analysis). Also, consider that some of the customizations are associated with one or more different spoken languages (e.g., English, French, German, etc.). In the case of the customizations, consider that documentation content associated with the customizations is associated with the spreadsheet application when the customizations are applied to the spreadsheet application (i.e., added onto the original application).

According to embodiments, individual content items (original documentation content and documentation content associated with customizations) are identified with identifying metadata and are tagged with XML tags and are associated with an XML schema that provides definitions of the XML tags. According to embodiments, depending on an Indexing Service's capability, a Property Handler 130 may be utilized, to parse the XML applied to the individual content items in accordance with the associated XML schema for segregating content items by type and context. That is, the Property Handler 130 is operative to interpret the identifying metadata (e.g., XML-based logical identifiers) applied to each content item. The Property Handler 130 need not be a separate software module as illustrated in FIG. 1, but the functionality of the Property Handler 130 may be incorporated with the functionality of the Indexing Service 125. As should be appreciated by those skilled in the art, Extensible Markup Language (XML) is a markup language that may be used to identify data objects. According to embodiments, identifying logical identifiers for various documentation content items may be tagged with XML tags to allow the associated content to be easily aggregated, stored and retrieved by parsing an associated XML schema that defines the utilized tags. Examples of logical identifiers may include Contributor/Publisher identifications, Language, Title, ID, Topic IDs, suppression data (described below), Keywords, and Document Sets of each content file. According to embodiments, such logical identifiers may be utilized to aid the system 100 in matching context to associated content. For example, a logical identifier for a help topic ID may be utilized to point to help content particularly applicable to the given help topic identification. As should be appreciated, XML is one suitable means for describing data, but other suitable means for describing data may be utilized, and the Property Handler may be programmed to interpret the data for the Indexing Service 125.

Once keyword information or other context metadata is utilized to determine which pieces of content should be aggregated together, the Indexing Service 125 may create a mapping of the metadata to a location of the content in the Data Store 140. That is, the Indexing Service 125 may store information about available content (in the form of the parsed metadata) so that the available content may subsequently be aggregated and retrieved by the Help Service 120. For example, according to an embodiment, after the Indexing Service 125 or Property Handler 130 interprets all content items associated with a software application, content items of like type or context may be stored together. For example, all content items from original software application documentation content and from customization documentation content pertaining to use of calculation formulas in cells contained in a given form may be stored together. Or, all content items, whether original or customized pertaining to printing various fields may be stored together. In addition, subsets of such stored or pointed to content items may be aggregated based on context. For example, those content items provided in French may be aggregated and those items in English may be aggregated together, and so on. Alternatively, while the actual content items may not be stored together, paths to the like content items may be aggregated and stored together. The content items or paths to the content items are stored and accessed to and from the Data Store 140 as described below.

The Data Store 140 or file system is a computing device such as a server containing software functionality operative to allow for storing aggregated content items or aggregated paths to content items received from the Indexing Service 125 based on interpretation of identifying metadata (logical identifiers) applied to documentation content items. In addition to storing aggregated content items or paths to content items at the Data Store 140, the Indexing Service 125 is operative to query the Data Store 140 for locations of data objects that meet search criteria of a content request as interpreted by the Property Handler 130. According to an embodiment, when documentation content is stored on a server (for example, Data Store 140) by a contributor, the Indexing Service 125 is operative to receive the documentation, to parse the documentation for metadata according to a schema (for example, XML-based metadata, used to described content items or artifacts contained in the documentation), to extract information from the documentation content that is identified according to one or more logical identifiers, and to store information about content items, such as paths to content items, to allow efficient location, aggregation and delivery of the content items to a requesting user.

In some cases, a contributor may make a modification to a piece of software, making documentation provided by previous contributors obsolete. According to an embodiment, a contributor may hide previous documentation from a user 115 in the metadata. By providing this setting in the metadata, a contributor may mask obsolete data from a user so that only the most current documentation within a particular context is provided to the user. As should be appreciated, the masking operation may take the form of application of metadata (e.g., suppression data) to the subject content that causes the Indexing Service 125 to identify the content as requiring masking or suppression from the eventual content items that are provided to a requesting user.

Referring still to FIG. 1, the Web Server 145 may be utilized for direct access to the Data Store 145 for content items responsive to a given content request. Direct access to the Data Store 145 is an alternative to access via the Help Service 120 and Indexing Service 125 described above. According to an alternative embodiment, a content request may be made directly to the Web Server 145 via an Active Server Page Framework (ASPX) without accessing the content via the Help Service 120.

Figure 3:
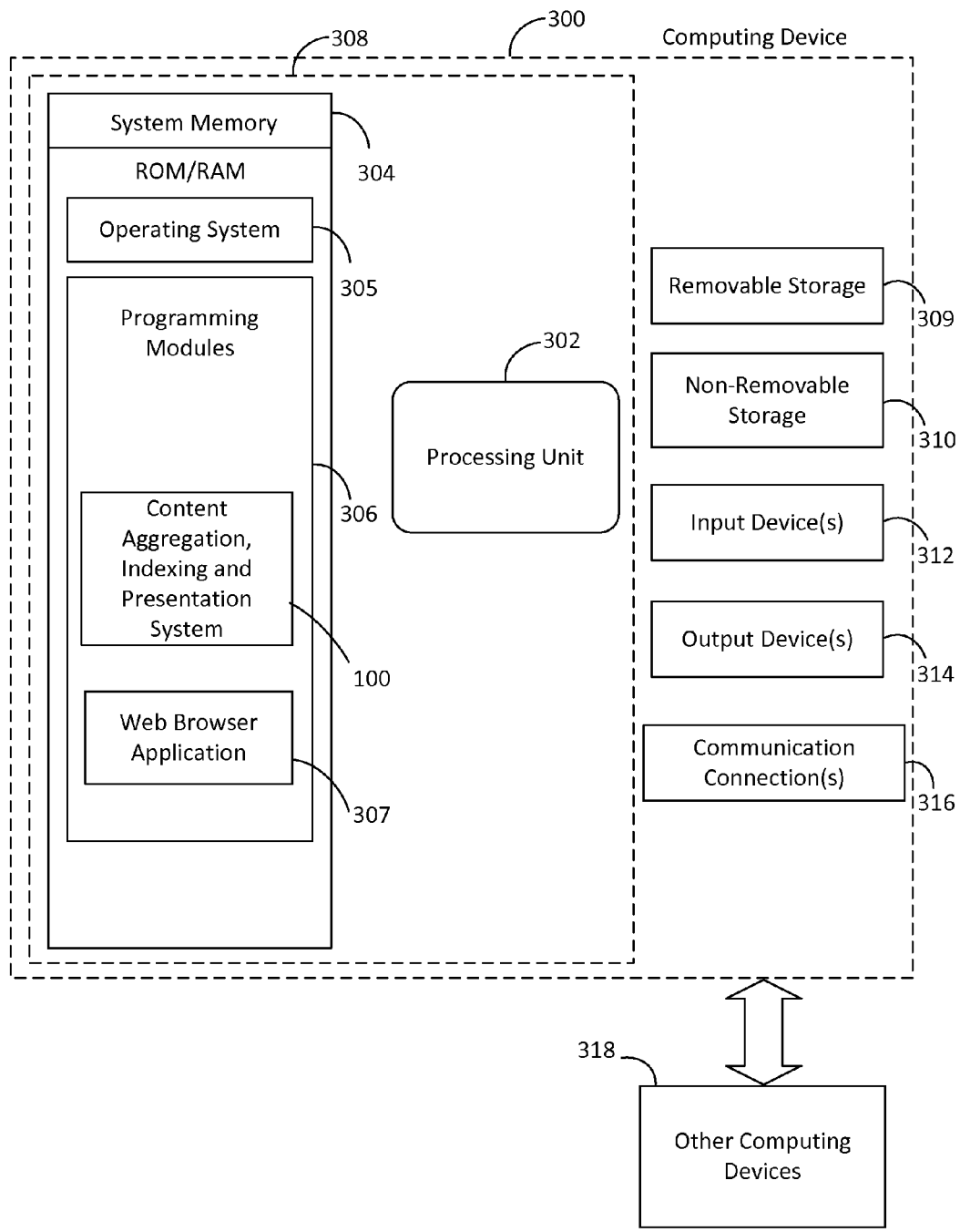
FIG. 3 is a simplified block diagram of a system including a computing device.

In many configurations, software system documentation may be located on individual client machines 300 (FIG. 3). In an example case where a company may utilize a dynamic base software system on a plurality of computers, documentation associated with the software system may be duplicated across each computer. Embodiments of the present invention allow for storage of all documentation on a local or remote server, and for retrieval of documentation content from the server when requested by the user 115. Metadata properties defined for each content item stored on a server may be mapped into the Indexing Service 125. As described above, the metadata properties may include the Contributor/Publisher, Language, Title, ID, Topic IDs, Suppressions, Keywords, and Document Sets of each content file.

Figure 2:
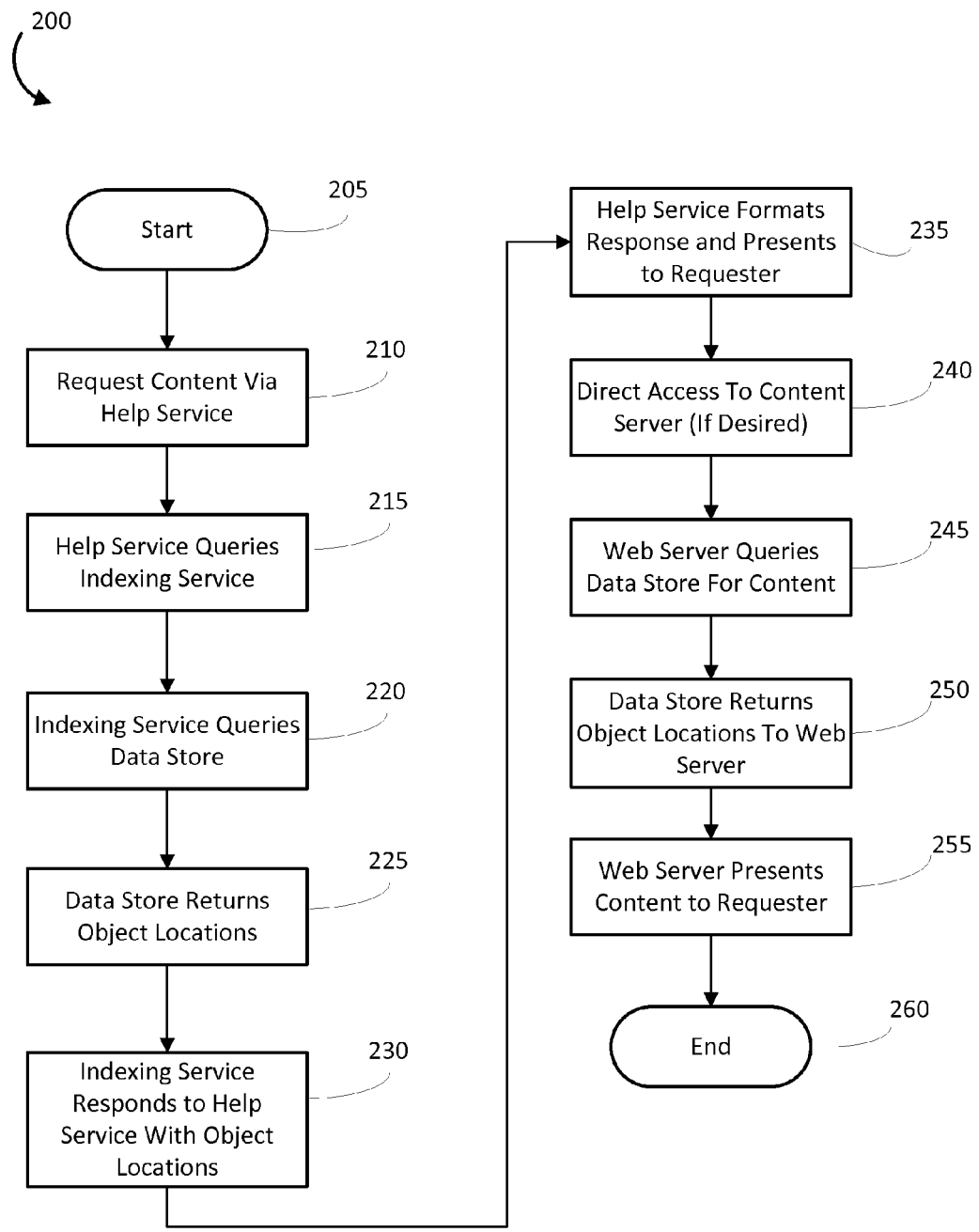
FIG. 2 illustrates an example process flow by which data is requested, queried, and presented to a user.

Having described an example system 100 of a computing architecture in which embodiments of the present invention may be practiced, FIG. 2 illustrates an example process flow by which data is requested, queried, and presented to a user. Referring to FIG. 1, the method for aggregating, indexing and presenting content begins at start operation 205 and proceeds to operation 210 where a user 115 makes a request to a Help Service 120 for all available content associated with a particular matter. For example, the user 115 may make a help request for how to use customized calculation functions in a spreadsheet application.

At operation 215, the Indexing Service 125 may be queried by the Help Service 120 for data that may be responsive to the client's request. At operation 220, the Indexing Service 125 looks up location information within its index for data that meets search criteria. For example, the Indexing Service 125 may query the Data Store 140 based on one or more keywords entered by the user 115 via the Help Service 120, and the entered keywords may be mapped to data stored at the Data Store 145 based on logical identifiers and associated metadata.

At operation 225, the Data Store 140 returns object locations for content items matching requested content to the Indexing Service 125. At operation 230, the Indexing Service 125 responds to the Help Service 120 with location and other data about each object (content item). For example, if a request is made for help content associated with printing various fields in a document, then object locations for content items identified as associated with printing fields in a document, whether part of original application documentation or customization documentation, may be returned for access by a requesting user. According to embodiments, context information may be utilized to further refine the returned object locations. For example, if the user's computing language is French, object locations of responsive content items in French may be returned so that the returned content or identified content is associated with the context of the request. As described above, all content items responsive to a given request may be stored in logical groupings, and all responsive content items stored in one or more logical groupings may be returned. For example, if a given logical grouping contains all help content items from a plurality of contributors associated with a desired help topic, then all content items in the logical grouping may be returned by the Indexing Service to the Help Service for presentation to the requesting user.

At operation 235, the Help Service 120 formats a proper response to the user 115 based on content items that are available from specified search or request criteria. According to an embodiment, the data may be manipulated in a way to make it suitable for presentation to the user 115 and to allow the client to request more detailed or further information. According to one embodiment, the response may be a Web page containing a set of links that a user may select and to which the user may navigate for retrieving documentation content (e.g., help content) desired by the user.

At operation 240, the user 115 may request direct access to content item objects through a Web Server 145 based on location information from the Help Service 120. According to an embodiment, subsequent requests may come through the Web Server 145. That is, a user's help request goes though the Help Service 120 for content that matches the context of the query, and the Indexing Service 125 may compile a list of responsive documentation content items or artifacts to send back to the user. As described above, the list may be in the form of a Web page containing a set of links to available documentation content. When the user chooses to navigate to one of the provided links, the request goes through the Web Server 145. At operation 245, the Web Server 145 queries the Data Store 140 directly. At operation 250, the Data Store 140 returns an object location reference for each responsive content item to the Web Server 145. At operation 255, the Web Server 145 presents the requested response to the user 115. The method ends at operation 260.

Having described embodiments of the present invention and an example logical flow illustrating a method for aggregating and presenting content from multiple contributors, FIG. 3 is a block diagram illustrating example physical components of a computing device 300 with which embodiments of the invention may be practiced. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include a web browser application 320. Operating system 305, for example, may be suitable for controlling computing device 300's operation. In one embodiment, programming modules 306 may include a logging engine 320 embedded in a web page and/or installed on computing device 300. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

Computing device 300 may also contain a communication connection 316 that may allow device 300 to communicate with other computing devices 318, such as over a network in a distributed computing environment, for example, an intranet or the Internet. Communication connection 316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 304, including operating system 305. While executing on processing unit 302, programming modules 306, such as the Content Aggregation, Indexing and Presentation system 100 described above with respect to FIG. 1 and the Web browser application 307 may perform processes including, for example, one or more method 200's stages as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/ or inserting or deleting stages, without departing from the invention.

As described herein, aggregating, indexing and presenting software system documentation (i.e., content) from multiple contributors is provided. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for aggregating and presenting content associated with a computer software system, the method comprising:

receiving content items associated with a computer software system from one or more content contributors, wherein each of the content items is identified according to a logical identifier;

parsing the received content items for logical identifiers associated with each of the received content items, the logical identifiers comprising context metadata;

utilizing an indexing service to create a mapping of the context metadata to a location of the content in a data store, the indexing service storing content items of a like type together, the content items comprising original software application documentation content and customization documentation content;

aggregating the content items into one or more logical groupings of the content items based on the logical identifiers associated with the content items, wherein each of the one or more logical groupings is associated with a given documentation content context associated with the computer software system; and receiving a user query for documentation content associated with a given documentation content context.

2. The method of claim 1, wherein aggregating content items into one or more logical groupings of content items based on the logical identifiers associated with the content items includes storing the aggregated content items for subsequent retrieval and presentation.

3. The method of claim 2, further comprising constructing an index of the aggregated content items aggregated into each of the one or more logical groupings of content.

4. The method of claim 3, further comprising:

querying the index of the aggregated content items aggregated into each of the one or more logical groupings of content for content items responsive to the user query for documentation content associated with the given documentation content context;

retrieving all content items aggregated into a logical grouping of content items associated with the given documentation content context; and providing the retrieved content items aggregated into a logical grouping of content items associated with the given documentation content context in response to the user query for documentation content associated with a given documentation content context.

5. The method of claim 4, wherein each of the one or more logical groupings into which content items are aggregated is also associated with a given documentation content context associated with the computer software system;

wherein retrieving all content items aggregated into a logical grouping of content items associated with the given documentation content context includes retrieving all content items aggregated into a logical grouping of content items associated with a given documentation content context associated with the computer software system; and wherein providing the retrieved content items aggregated into a logical grouping of content items associated with the given documentation content context in response to the user query for documentation content associated with a given documentation content context includes providing the retrieved content items aggregated into a logical grouping of content items associated with the given documentation content context in response to the user query for documentation content associated with a given documentation content context.

6. The method of claim 4, wherein providing the retrieved content items aggregated into a logical grouping of content items associated with the given documentation content context in response to the user query for documentation content associated with a given documentation content context includes displaying the retrieved content items upon a selection by a requesting user to review the displayed content items.

7. The method of claim 4, wherein providing the retrieved content items aggregated into a logical grouping of content items associated with the given documentation content context in response to the user query for documentation content associated with a given documentation content context includes displaying computer-accessible paths to the retrieved content items upon a selection by a requesting user to obtain the retrieved content items via the computer-accessible paths.

8. The method of claim 7, wherein displaying computer-accessible paths to the retrieved content items upon a selection by a requesting user to obtain the retrieved content items via the computer-accessible paths includes displaying one or more selectable links which when selected cause a display of the retrieved content items associated with the one or more selectable links.

9. A computer system for aggregating and presenting content associated with a computer software system, the computer system comprising:

a memory storage for storing executable program code; and a processing unit, functionally coupled to the memory storage, the processing unit being responsive to computer-executable instructions contained in the program code and operative to:

receive content items associated with the computer software system from one or more content contributors, wherein each of the content items is identified according to a logical identifier;

parse the received content items for the logical identifiers, the logical identifiers comprising context metadata;

utilize an indexing service to create a mapping of the context metadata to a location of the content in a data store, the indexing service storing content items of a like type together, the content items comprising original software application documentation content and customization documentation content;

aggregate content items into one or more logical groupings of content items based on the logical identifiers associated with the content items, wherein each of the one or more logical groupings is associated with a given documentation content context associated with the computer software system;

store information about the aggregated content items in the data store, wherein the information about the aggregated content items is utilized to locate and subsequently retrieve the aggregated content items; and receive a user query for documentation content associated with a given documentation content context.

10. The computer system of claim 9, wherein the processing unit is further operative to:

construct an index of the aggregated content items aggregated into each of the one or more logical groupings of content.

11. The computer system of claim 10, wherein the processing unit is further operative to:

retrieve all content items aggregated into a logical grouping of content associated with the given documentation content context;

provide a help service to the retrieved all content items aggregated into a logical grouping of content associated with the given documentation content context; and display the retrieved all content items aggregated into a logical grouping of content associated with the given documentation content context in response to the user query for documentation content associated with a given documentation content context.

12. The computer system of claim 9, wherein the processing unit is further operative to:
parse the received content items for the logical identifiers according to extensible markup language (XML) tags applied to each logical identifier, the XML tags being defined according to an XML schema and utilized by the indexing service to aggregate content items into one or more logical groupings of content items based on the logical identifiers associated with the content items, wherein each of the one or more logical groupings is associated with a given documentation content context associated with the computer software system.

13. The computer system of claim 9, wherein the processing unit is further operative to:
provide direct access to the data store for retrieval of all content items aggregated into a logical grouping of content associated with the given documentation content context; and
display the retrieved all content items aggregated into a logical grouping of content associated with the given documentation content context in response to the user query for documentation content associated with a given documentation content context.

14. A tangible computer readable medium containing computer executable instructions which when executed by a computer perform a method for aggregating and presenting content associated with a computer software system, the method comprising:
receiving content items associated with a computer software system from one or more content contributors, wherein each of the content items is identified according to a logical identifier;
parsing the received content items for logical identifiers according to extensible markup language (XML) tags applied to each logical identifier, the XML tags being defined according to an XML schema, wherein each logical identifier comprises context metadata;
utilizing an indexing service to create a mapping of the context metadata to a location of the content items in a data store, the indexing service storing content items of a like type together, the content items comprising original software application documentation content and customization documentation content;
aggregating the content items into one or more logical groupings of content items based on the logical identifiers associated with the content items, wherein each of the one or more logical groupings is associated with a given documentation content context associated with the computer software system; and
receiving a user query for documentation content associated with a given documentation content context.

15. The tangible computer readable medium of claim 14, wherein aggregating content items into one or more logical groupings of content items based on the logical identifiers associated with the content items includes storing the aggregated content items for subsequent retrieval and presentation.

16. The tangible computer readable medium of claim 15, further comprising constructing an index of the aggregated content items aggregated into each of the one or more logical groupings of content.

17. The tangible computer readable medium of claim 16, further comprising:
parsing the index of the aggregated content items aggregated into each of the one or more logical groupings of content for content items responsive to the query for documentation content associated with a given documentation content context;
retrieving all content items aggregated into a logical grouping of content items associated with the given documentation content context; and
providing the retrieved content items aggregated into a logical grouping of content items associated with the given documentation content context in response to the query for documentation content associated with a given documentation content context.

18. The tangible computer readable medium of claim 17, wherein each of the one or more logical groupings into which content items are aggregated is also associated with a given documentation content context associated with the computer software system, wherein receiving a user query for documentation content associated with a given documentation content context also includes receiving a user query for documentation content associated with a given documentation content context, wherein retrieving all content items aggregated into a logical grouping of content items associated with the given documentation content context includes retrieving all content items aggregated into a logical grouping of content items associated with a given documentation content context associated with the computer software system, and wherein providing the retrieved content items aggregated into a logical grouping of content items associated with the given documentation content context in response to the query for documentation content associated with a given documentation content context includes providing the retrieved content items aggregated into a logical grouping of content items associated with the given documentation content context in response to the user query for documentation content associated with a given documentation content context.

* * * * *